(12) United States Patent
Fang et al.

(10) Patent No.: US 10,578,945 B2
(45) Date of Patent: Mar. 3, 2020

(54) LIQUID CRYSTAL LENS ASSEMBLY, LIQUID CRYSTAL PANEL, AND LIQUID CRYSTAL DISPLAY DEVICE

(71) Applicant: BOE TECHNOLOGY GROUP CO., LTD., Beijing (CN)

(72) Inventors: Zheng Fang, Beijing (CN); Yunsik Im, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/026,444

(22) Filed: Jul. 3, 2018

(65) Prior Publication Data
US 2019/0204709 A1 Jul. 4, 2019

(30) Foreign Application Priority Data
Jan. 2, 2018 (CN) .......................... 2018 1 0002663

(51) Int. Cl.
*G02F 1/29* (2006.01)
(52) U.S. Cl.
CPC .......... *G02F 1/29* (2013.01); *G02F 2201/122* (2013.01); *G02F 2201/128* (2013.01); *G02F 2203/01* (2013.01)
(58) Field of Classification Search
CPC ....................................................... G02F 1/29
See application file for complete search history.

(56) References Cited

U.S. PATENT DOCUMENTS

| | | | | |
|---|---|---|---|---|
| 2009/0153653 | A1* | 6/2009 | Lee | G02F 1/13471 348/59 |
| 2012/0242913 | A1* | 9/2012 | Miyazawa | G02B 3/12 349/5 |
| 2016/0291740 | A1* | 10/2016 | Yang | G06F 3/046 |
| 2017/0139222 | A1* | 5/2017 | Yang | G02B 27/22 |
| 2017/0300152 | A1* | 10/2017 | Ye | G02F 1/1343 |
| 2019/0025657 | A1* | 1/2019 | Presniakov | G02F 1/1337 |
| 2019/0204640 | A1* | 7/2019 | Li | G02F 1/1343 |

FOREIGN PATENT DOCUMENTS

| | | |
|---|---|---|
| CN | 101458412 A | 6/2009 |
| CN | 102692768 A | 9/2012 |
| CN | 104360520 A | 2/2015 |

* cited by examiner

*Primary Examiner* — Sang V Nguyen
(74) *Attorney, Agent, or Firm* — Foley & Lardner LLP; James F. Ewing; Paul M. H. Pua

(57) ABSTRACT

The present disclosure relates to a liquid crystal lens assembly, a liquid crystal panel, and a liquid crystal display device. The liquid crystal lens assembly includes: a liquid crystal layer, a first electrode layer having a plurality of first bar electrodes, and a second electrode layer having a plurality of second bar electrodes. The first electrode layer and the second electrode layer are both provided on a first side of the liquid crystal layer, and an extending direction of the first bar electrodes intersects with an extending direction of the second bar electrodes. The present disclosure can increase a utilization efficiency of light beams, and reduce a power consumption of the light source side.

20 Claims, 6 Drawing Sheets

LIQUID CRYSTAL LENS ASSEMBLY, LIQUID CRYSTAL PANEL, AND LIQUID CRYSTAL DISPLAY DEVICE

CROSS-REFERENCE TO RELATED APPLICATIONS

The present application claims priority of Chinese Patent Application No. 201810002663.5, as filed on Jan. 2, 2018. The disclosure of which is incorporated herein by reference in its entirety.

TECHNICAL FIELD

The present disclosure relates to the field of liquid crystal, and particularly to a liquid crystal lens assembly, a liquid crystal panel, and a liquid crystal display device.

BACKGROUND

With the rapid development of liquid crystal display technologies, handheld electronic devices become more and more popular, and also, the requirement of low power consumption of electronic devices becomes higher during use. Due to the presence of a polarizer, a luminance of some liquid crystal display devices in the related technologies will be decreased by over a half, without the consideration of other factors. To reach the display requirement, more energy has to be consumed. Based on the requirement of the low power consumption, a liquid crystal lens is used to control the light path during display in the related technologies.

In the related technologies, a liquid crystal lens assembly is provided with a group of bar electrodes in the same direction and a surface electrode respectively on upper and lower sides of a liquid crystal layer. The bar electrodes are arranged at spacing along x axis and extend along y axis. After the surface electrode and the bar electrodes are powered on, an electric field formed by electrode layers above and below the liquid crystal layer can control a deflection of liquid crystal molecules, such that a liquid crystal lens in a cylindrical form with a arcuate cross section can be formed. By utilizing such form of liquid crystal lens assembly to converge light beams, a light-emitting angle can be controlled and a display luminance can be increased.

SUMMARY

According to one aspect of the present disclosure, a liquid crystal lens assembly is provided, comprising:
a liquid crystal layer;
a first electrode layer, having a plurality of first bar electrodes; and
a second electrode layer, having a plurality of second bar electrodes,
wherein, the first electrode layer and the second electrode layer are both provided on a first side of the liquid crystal layer, and an extending direction of the first bar electrodes intersects with an extending direction of the second bar electrodes.

In some embodiments, further comprising:
a third electrode layer, having a plurality of third bar electrodes; and
a fourth electrode layer, having a plurality of fourth bar electrodes,
wherein, the third electrode layer and the fourth electrode layer are both provided on a second side of the liquid crystal layer, and an extending direction of the third bar electrodes intersects with an extending direction of the second bar electrodes.

In some embodiments, the extending direction of the first bar electrodes intersects with the extending direction of the second bar electrodes at an angle of 80 to 100 degrees.

In some embodiments, the extending direction of the first bar electrodes is perpendicular to the extending direction of the second bar electrodes.

In some embodiments, the extending directions of the third bar electrodes intersects with the extending direction of the fourth bar electrodes at an angle of 80 to 100 degrees.

In some embodiments, the extending direction of the third bar electrodes is perpendicular to the extending direction of the fourth bar electrodes.

In some embodiments, the plurality of first bar electrodes are parallel to each other with an identical space, and a width of each of the first bar electrodes is identical.

In some embodiments, the plurality of second bar electrodes are parallel to each other with an identical space, and a width of each of the second bar electrodes is identical.

In some embodiments, the space between two adjacent first bar electrodes is the same as the space between two adjacent second bar electrodes, and the width of each of the first bar electrodes is the same as the width of each of the second bar electrodes.

In some embodiments, the plurality of third bar electrodes are parallel to each other with an identical space, and a width of each of the third bar electrodes is identical.

In some embodiments, the plurality of fourth bar electrodes are parallel to each other with an identical space, and a width of each of the fourth bar electrodes is identical.

In some embodiments, the space between two adjacent third bar electrodes is the same as the space between two adjacent fourth bar electrodes, and the width of each of the third bar electrodes is the same as the width of each of the fourth bar electrodes.

In some embodiments, an insulating layer is further provided between the first electrode layer and the second electrode layer.

In some embodiments, an insulating layer is further provided between the third electrode layer and the fourth electrode layer.

According another aspect of the present disclosure, a liquid crystal panel is provided, comprising: the aforementioned liquid crystal lens assembly.

According another aspect of the present disclosure, a liquid crystal display device is provided, comprising: the aforementioned liquid crystal panel.

BRIEF DESCRIPTION OF THE DRAWINGS

The accompanying drawings, as a part of the Description, describe embodiments of the present disclosure, and used to explain principles of the present disclosure together with the Description. With reference to the accompanying drawings, the present disclosure may be understood more clearly based on the following details. In particular.

Figure 1:
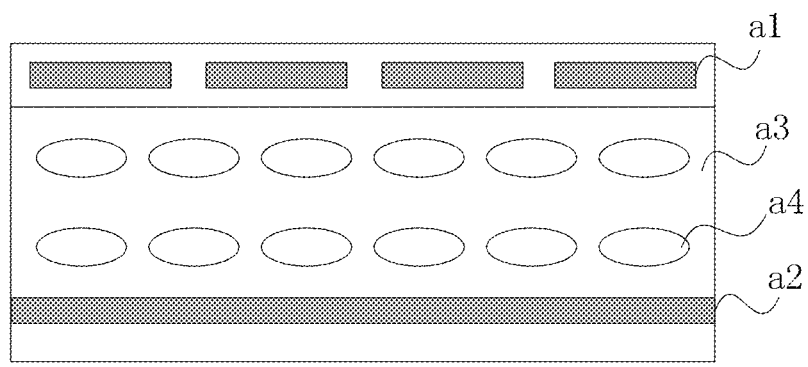
FIG. 1 illustrates a sectional view of one example of the liquid crystal lens assembly in the related technologies.

It should be understood that, respective dimensions of various portions as shown in the accompanying drawings are not plot in accordance with actual proportional relations. In addition, identical or similar reference signs denote identical or similar members.

DETAILED DESCRIPTION

The exemplary embodiments of the present disclosure will now be described in detail with reference to the accompanying drawings. The description of the exemplary embodiments is intended to be merely illustrative, and is not meant to be limitation on the present disclosure and its application or use in any way. The present disclosure may be implemented in many different forms, not limited to the embodiments described herein. These embodiments are provided so that this disclosure will be thorough and complete, and will fully convey the scope of the disclosure to the person skilled in the art. It should be noted that, unless otherwise specified, relative arrangement of components and steps set forth in these embodiments are to be construed as merely illustrative, not as a limitation.

The terms "first", "second" and similar words used in the present disclosure do not denote any order, quantity, or importance, but merely serve to distinguish different parts. Similar words like "include" or "comprise" mean that the element that precedes the word covers the elements listed after that term, but does not exclude the possibility of also covering other elements. "Up/Above", "Down/Below", "Left", "Right", and the like are used only to indicate a relative positional relationship, and when the absolute position of the described object is changed, the relative positional relationship may also change correspondingly.

In the present disclosure, when it is described that a specific component is located between a first component and a second component, an intervening component may exist between the specific component and the first or second component, or there may be no intervening component. When it is described that a specific component is connected to other components, the specific component may be directly connected with the other components without having an intervening component therebetween, or may not be directly connected with the other components but have an intervening component therebetween.

Unless otherwise specifically defined, all terms (including technical terms or scientific terms) used in the present disclosure have the same meanings as understood by one of ordinary skill in the art to which the present disclosure belong. It will also be understood that terms defined in, for example, common dictionaries should be interpreted as having meanings that are consistent with their meanings in the context of the relevant art, and should not be interpreted in an idealized or extremely formal sense unless expressly defined here.

Techniques, methods, and devices known to one of ordinary skill in the relevant art may not be discussed in detail but, where appropriate, such techniques, methods, and devices are to be considered part of the description.

The inventor has found through research that, the related technologies involved in BACKGROUND can realize the control of the light-emitting angle only for an x-axis component of the light source coinciding with the direction in which the bar electrodes are arranged at spacing, rather than for a y-axis component of the light source perpendicular to the x-axis component. This portion of uncontrolled light beams cannot be utilized, and make the display luminance not high. In addition, this portion of uncontrolled light beams will further affect the display effect because of being not absorbed. For example, when a dark image is displayed, the y-axis component of the light source is uncontrollable and thus cannot be absorbed by the light absorbing layer, which results in a lack of darkness, a decrease in contrast of the display image and the like.

For this reason, embodiments of the present disclosure provide a liquid crystal lens assembly, a liquid crystal panel, and a liquid crystal display device, capable of increasing the utilization efficiency of light beams.

Figure 2:
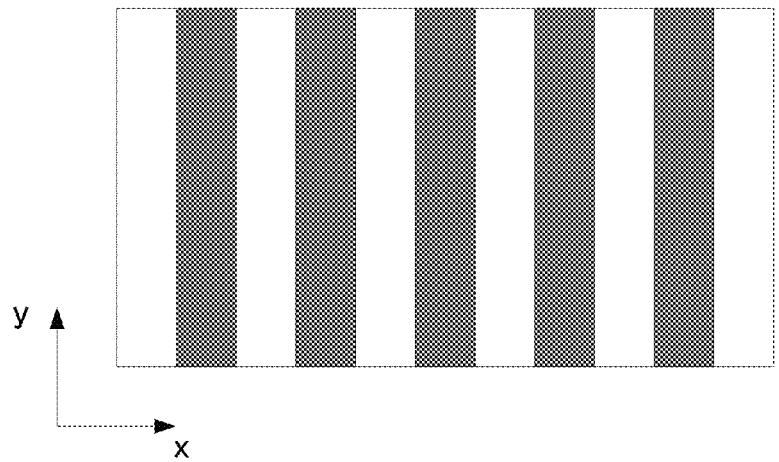
FIG. 2 illustrates a top view of the bar electrodes in the example of FIG. 1.
Figure 3:
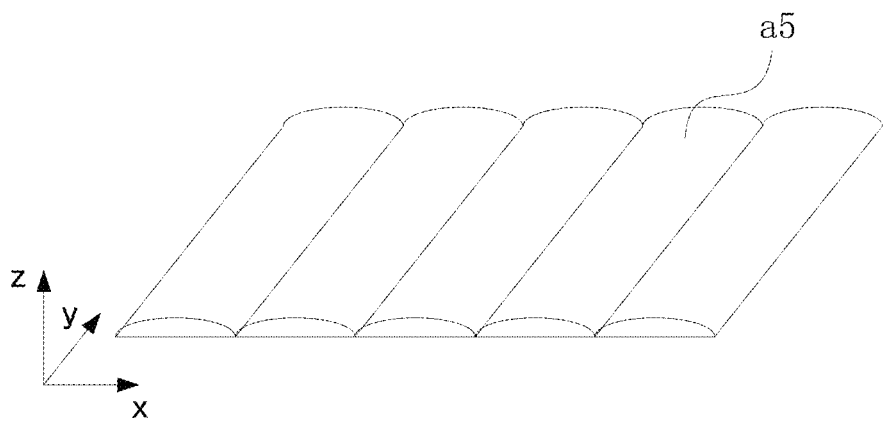
FIG. 3 illustrates an effect diagram of the liquid crystal lens as formed in the example of FIG. 1.

FIG. 1 illustrates a sectional view of one example of the liquid crystal lens assembly in the related technologies. FIG. 2 illustrates a top view of the bar electrodes in the example of FIG. 1. With reference to FIG. 1 and FIG. 2, the liquid crystal lens assembly in the related technologies is provided with a group of bar electrodes a1 in the same direction and a surface electrode a2 respectively on upper and lower sides of a liquid crystal layer a3. The bar electrodes a1 are arranged at spacing along the x axis and extend along the y axis. After the surface electrode a2 and the bar electrodes a1 are powered on, an electric field formed by electrode layers above and below the liquid crystal layer a3 can control a deflection of liquid crystal molecules a4, and an effect diagram of a liquid crystal lens a5 in a cylindrical form with a arcuate cross section as shown in FIG. 3, may be formed.

The example of the related technologies can realize the control of the light-emitting angle only for an x-axis component of the light source coinciding with the direction in which the bar electrodes a1 are arranged at spacing, rather than for a y-axis component of the light source perpendicular to the x-axis component. This portion of uncontrolled beams cannot be utilized, and make the display luminance not high. In addition, this portion of uncontrolled beams will further affect the display effect because of being not absorbed.

Figure 4:
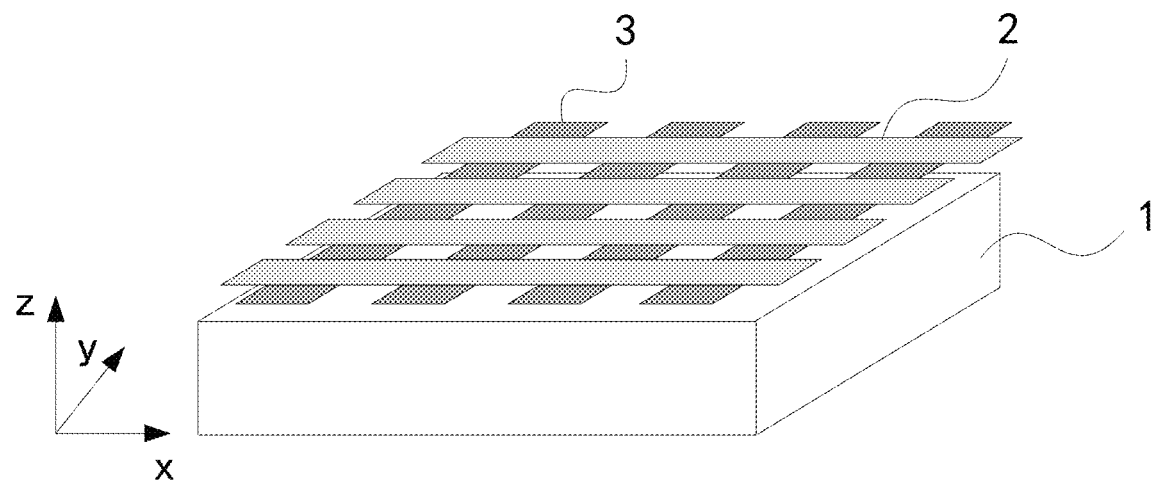
FIG. 4 illustrates a structural chart according to some embodiments of the liquid crystal lens assembly of the present disclosure.
Figure 5:
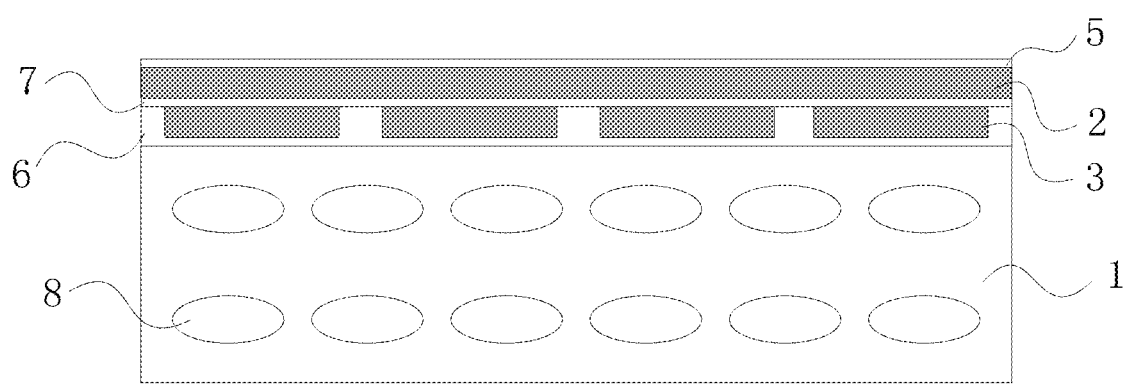
FIG. 5 illustrates a sectional view according to some embodiments of the liquid crystal lens assembly of the present disclosure.

FIG. 4 illustrates a structural chart according to some embodiments of the liquid crystal lens assembly of the present disclosure. With reference to FIG. 4 and the sectional view of some embodiments of the liquid crystal lens assembly as shown in FIG. 5, the liquid crystal lens assembly of the present embodiments comprise: a liquid crystal layer 1, a first electrode layer 5, and a second electrode layer 6. The first electrode layer 5 has a plurality of first bar electrodes 2. The second electrode layer 6 has a plurality of second bar electrodes 3. The first electrode layer 5 and the second electrode layer 6 are both provided on a first side of the liquid crystal layer 1, and an extending direction of the first bar electrodes 2 intersects with that of the second bar electrodes 3. The extending direction herein is directed to a longitudinal extending direction of the bar electrodes.

By both providing the first bar electrodes 2 and the second bar electrodes 3 of which the extending direction intersect with each other on one side of the liquid crystal layer 1, the present embodiments can utilize an electric field formed by electrodes to perform a control function for mutually orthogonal coordinate directions of a plane of the liquid crystal layer, so as to increase the utilization efficiency of beams and improve the display quality. Under the requirement of an equal display luminance, the present embodiments improve the utilization efficiency of light beams, and thus reduce a power consumption of the light source side accordingly.

In the present embodiments, the first bar electrodes 2 and the second bar electrodes 3 may be powered with a particular voltage at the same time. For example, one of the first bar electrodes and the second bar electrodes is powered with a direct current voltage (for example, a direct current voltage having a voltage value close to 0V), and the other one is powered with an alternating current voltage (for example, an alternating current voltage switching back and forth between −5.5V and +5.5V). In this way, the non-overlapping portion between the first bar electrodes 2 and the second bar electrodes 3 will form a cyclically variable electric field to prevent a constant electric field from causing polarization of liquid crystal molecules 8. In the liquid crystal layer 1, a portion of the liquid crystal molecules 8 corresponding to the electrode layers will present a particular arrangement under the voltage drive of the electric field, and form a liquid crystal lens effect similar to a semi-sphere or semi-ellipsoid.

In addition, although the related technologies involve the arrangement, on both sides of the liquid crystal layer, of electrode layers of the bar electrodes of which the extending directions intersect with each other, a perpendicular electric field is easily formed between the bar electrodes on both sides of the liquid crystal layer because the bar electrodes in different extending directions are respectively provided on both sides of the liquid crystal layer. Liquid crystal molecules in the perpendicular electric field are mainly subject to a deflection control of the perpendicular electric field (namely the z axis direction in FIG. 4) and accordingly are less subject to a deflection control of orthogonal directions (namely x and y axes of FIG. 4) electric field parallel to the electrode layers, which results in a bad shape of the formed liquid crystal lens such that the utilization effect of light beams of the light source is limited.

Due to a short distance, neighboring electrode layers provided on the same side of the liquid crystal layer in the present embodiments have almost no or only very little perpendicular electric field. Therefore, orthogonal directions electric field which are parallel to the electrode layers are mainly formed. Such an electric field can control the deflection of the liquid crystal molecules corresponding to the side of the liquid crystal layer, such that a relatively ideal shape of the liquid crystal lens can be easily formed and the utilization effect of beams can be enhanced.

Regarding the arrangement of the first electrode layer 5 and the second electrode layer 6 on the first side of the liquid crystal layer 1, FIG. 5 sets the first side of the liquid crystal layer 1 as an upper side of the liquid crystal layer 1, namely a side close to the viewer, while other embodiments also may set the first side of the liquid crystal layer 1 as a lower side of the liquid crystal layer, namely a side close to the light source (such as a backlight assembly).

In FIG. 4, to conveniently show a spatial relationship between a plurality of first bar electrodes 2 and a plurality of second bar electrodes 3, only the first bar electrodes 2, the second bar electrodes 3, and the liquid crystal layer 1 are plotted. The respective electrode layers corresponding to the bar electrodes may refer to the arrangement positions and patterns as shown in FIG. 5. The respective bar electrodes corresponding to the first electrode layers 5 and the second bar electrodes 6 may be formed by designing cracks on a substrate. To avoid a short circuit between the first electrode layer 5 and the second electrode layer 6, an insulating layer 7 may be further provided between the first electrode layer 5 and the second electrode layer 6. The insulating layer 7 may include $SiO_x$, $SiN_x$, $SiO_xN_y$, $AlO_x$, $TiO_x$, $CrO_x$, and etc.

Figure 6:
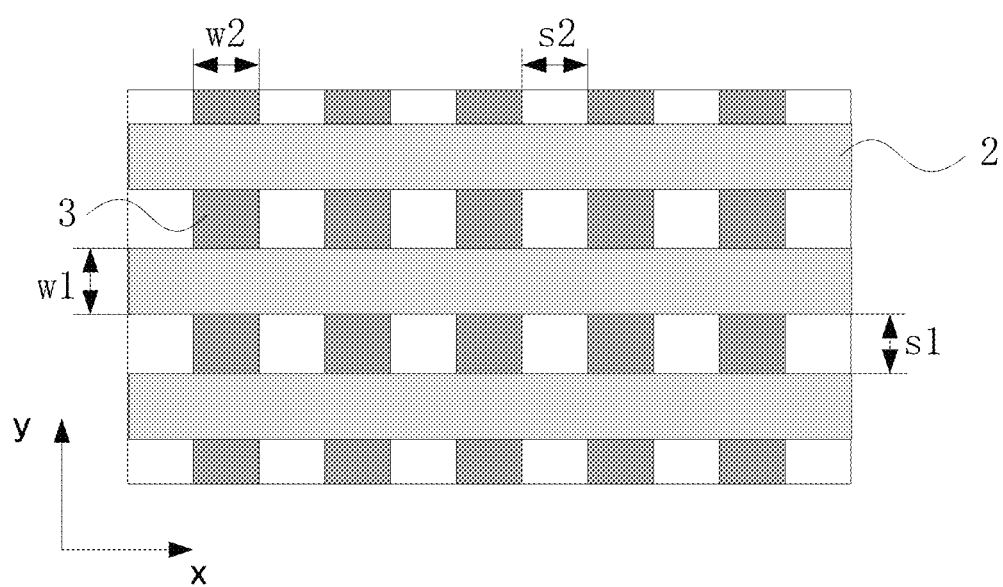
FIG. 6 illustrates a top view of the first bar electrodes and the second bar electrodes according to the embodiments of FIG. 4.

FIG. 6 illustrates a top view of the first bar electrodes and the second bar electrodes according to the embodiments of FIG. 4. Considering that the liquid crystal lens assembly performs a control function for the light source in mutually orthogonal coordinate directions (for example, x axis and y axis as shown in FIG. 6), an angle, at which the extending direction of the first bar electrodes 2 intersects with the extending direction of the second bar electrodes 3, takes a certain effect on the x-axis components and y-axis components of the light source. For this reason, the angle, at which the extending direction of the first bar electrodes 2 intersects with the extending direction of the second bar electrodes 3, may be optionally 80 to 100 degrees. This angle is close to an orthogonal angle, and thus the light source components assigned to the mutually orthogonal coordinate directions can achieve a strong controlled function, such that a high utilization efficiency of light beams can be obtained. Furthermore, by referring to FIG. 6, the extending directions of the first bar electrodes 2 and the second bar electrodes 3 can be set to be perpendicular to each other, such that the utilization efficiency of light beams can be increased to a greatest extent.

To cause a drive voltage formed by the bar electrodes to control light beams more uniformly, the plurality of first bar electrodes 2 may be parallel to each other with an identical space. Moreover, a width of each of the first bar electrodes 2 may also be identical. Referring to FIG. 6, the space between any two adjacent first bar electrodes 2 may have an equal space s1, and each of the first bar electrodes 2 has an equal width w1. By setting the space s1 to be equal and setting the width w1 to be equal, an angle of light beams in the perpendicular direction of the first bar electrodes 2 can be controlled more uniformly. In some other embodiments, the space s1 and width w1 may be also set to be unequal according to actual requirements of the control.

Likewise, the plurality of second bar electrodes 3 may be also set to be parallel to each other with an identical space s2. Moreover, a width w2 of each of the second bar electrodes 3 may also be identical, such that an angle of light beams in the perpendicular direction of the second bar electrodes can be controlled more uniformly.

Figure 7:
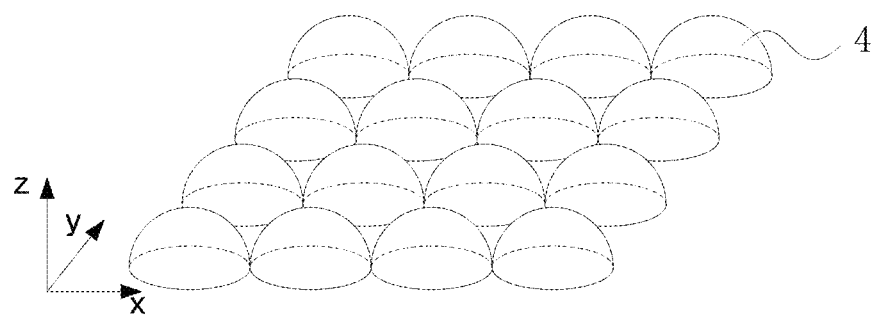
FIG. 7 illustrates an effect diagram of the liquid crystal lens as formed according to the embodiments of FIG. 4.

FIG. 7 illustrates an effect diagram of the liquid crystal lens as formed according to the embodiments of FIG. 4. Referring to FIG. 7, when the space s1 between two adjacent first bar electrodes 2 is the same as the space s2 between two adjacent second bar electrodes 3, and the width w1 of each of the plurality of first bar electrodes 2 is the same as the width w2 of each of the plurality of second bar electrodes 3, the liquid crystal molecules 8 in the liquid crystal layer 1 can present a relatively ideal semispherical shape 4 of liquid crystal lenses which are periodically arranged, under an effect of the electric field. At this time, the liquid crystal molecules 8 can obtain a better transmission effect, and the utilization efficiency of beams can be increased to a greater extent.

Figure 8:
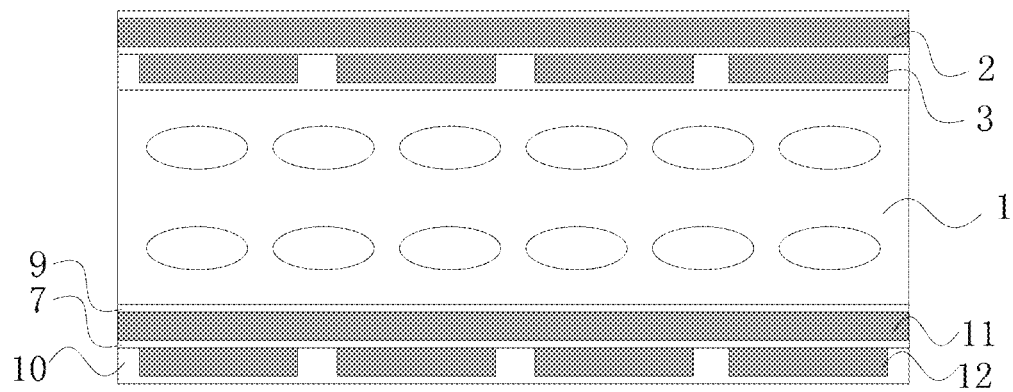
FIG. 8 illustrates a sectional view according to some other embodiments of the liquid crystal lens assembly of the present disclosure.

FIG. 8 illustrates a sectional view according to some other embodiments of the liquid crystal lens assembly of the present disclosure. As compared with the aforementioned embodiments of the liquid crystal lens assembly, the present embodiments further comprise a third electrode layer 9 and a fourth electrode layer 10, which are both provided on a second side of the liquid crystal layer 1. The second side herein is an opposite side of the first side of the liquid crystal layer 1. The third electrode layer 9 has a plurality of third bar electrodes 11. The fourth electrode layer 10 has a plurality of fourth bar electrodes 12. An extending direction of the third bar electrodes 11 intersects with that of the fourth bar electrodes 12. The first electrode layer 5 and the second electrode 6 in the aforementioned respective embodiments may be also provided on the second side of the liquid crystal layer 1 respectively as the third electrode layer 9 and the fourth electrode layer 10. To avoid a short circuit between the third electrode layer 9 and the fourth electrode layer 10, an insulating layer 7 may be further provided between the third electrode layer 9 and the fourth electrode layer 10.

In this way, by means of the arrangements of electrode layers on upper and lower sides of the liquid crystal layer 1, the present embodiments can achieve a control function for more liquid crystal molecules in a thicker liquid crystal layer 1. On the other hand, as compared with the aforementioned embodiment in which the first electrode layer 5 and second electrode layer 6 are provided on a single side, the present embodiments may use a lower drive voltage for the electrode layers and save the power consumption, under the same control effect.

To cause a drive voltage formed by the bar electrodes to control light beams more uniformly, the plurality of third bar electrodes 11 may be parallel to each other with an identical space. Moreover, a width of each of the third bar electrodes 11 may also be identical. The space between any two adjacent the third bar electrodes 11 may have an equal space, and each of the third bar electrodes 11 has an equal width. By setting the space to be equal and setting the width to be equal, an angle of light beams in the perpendicular direction of the third bar electrodes 11 can be controlled more uniformly. In some other embodiments, the space and width may be also set to be unequal according to actual requirements of the control.

Likewise, the plurality of fourth bar electrodes 12 may be also set to be parallel to each other with an identical space. Moreover, a width of each of the fourth bar electrodes 12 may also be identical, such that an angle of light beams in the perpendicular direction of the fourth bar electrodes 12 can be controlled more uniformly.

When the space between two adjacent third bar electrodes 11 is the same as the space between two adjacent fourth bar electrodes 12, and the width of each of the plurality of third bar electrodes 11 is the same as the width of each of the plurality of fourth bar electrodes 12, the liquid crystal molecules 8 in the liquid crystal layer 1 can present a relatively ideal semispherical shape 4 of liquid crystal lenses which are periodically arranged, under an effect of the electric field. At this time, the liquid crystal molecules 8 can obtain a better transmission effect, and the utilization efficiency of beams can be increased to a greater extent.

By simulating related technologies in which bar electrodes cooperate with a surface electrode and some embodiments of the liquid crystal lens assembly of the present disclosure, both are compared to obtain a significant difference in the utilization effect of light beams.

The bar electrodes each employ an Indium Tin Oxides (briefly referred to as ITO) semiconductor transparent conductive film electrode, and a ratio of a width of each of the bar electrodes and a space between two adjacent bar electrodes is 2.6/5.4, namely W/S=2.6/5.4. A drive voltage applied to the electrodes is 5.5 V, that is, one group of electrodes are applied with a direct current voltage close to 0 V, and the other group of electrodes are applied with an alternating current voltage from +5.5 V to −5.5 V, as previously mentioned.

Figure 9:
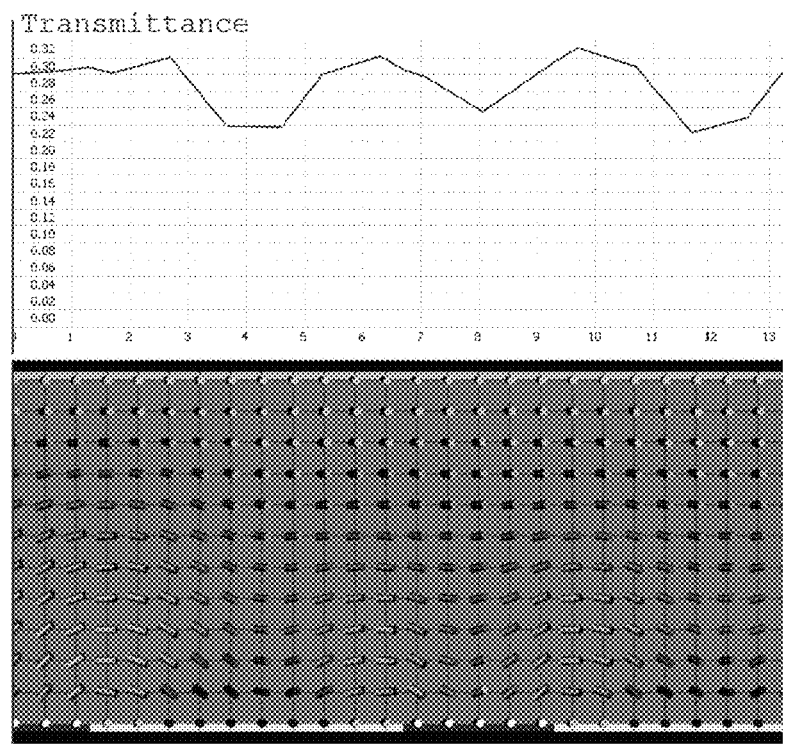
FIG. 9 and FIG. 10 respectively illustrate analytical charts of transmittances of x and y axial sections under the same W/S and drive voltage in the example of the liquid crystal lens assembly of the related technologies.
Figure 10:
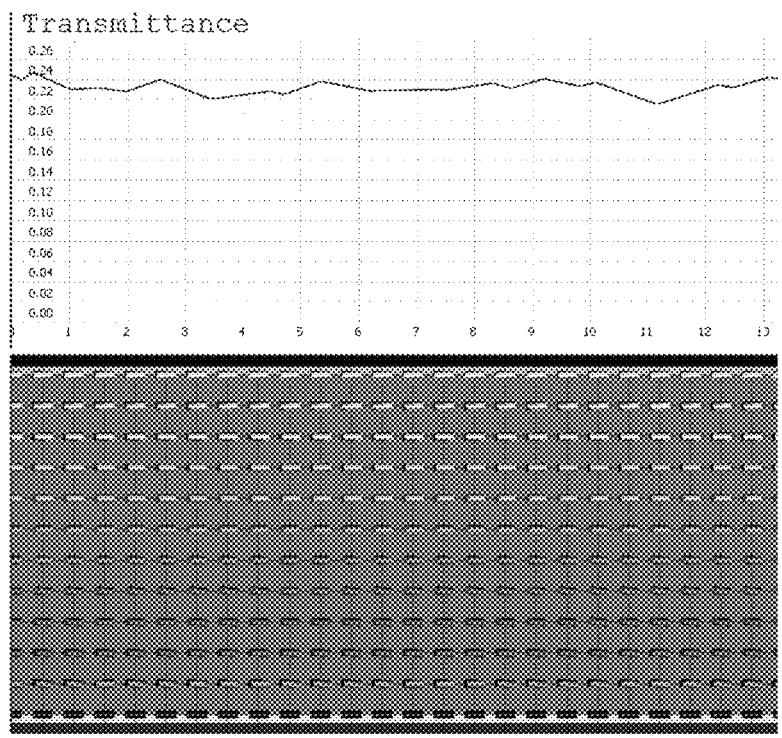

Under the above conditions, analytical charts for transmittances of the x axis and y axis directional sections in the related technologies are seen in FIG. 9 and FIG. 10. As seen from FIG. 9 and FIG. 10, in the related technologies a transmittance value in the x axis direction is in an obvious fluctuation, a phase difference corresponding to the liquid crystal lens can be formed, and a peak can reach 0.30. The liquid crystal molecules are also periodically arranged in a circular arc. In the y axis direction, the liquid crystal molecules are arranged in substantially the same direction, and cannot form a liquid crystal lens that changes the light travel direction, which is embodied as only a small fluctuation of a transmittance value between 0.20 and 0.24. Thus it can be learned that, the related technologies involve a low transmittance in the y axis direction, which results in a low utilization efficiency of light beams in the y axis direction.

Figure 11:
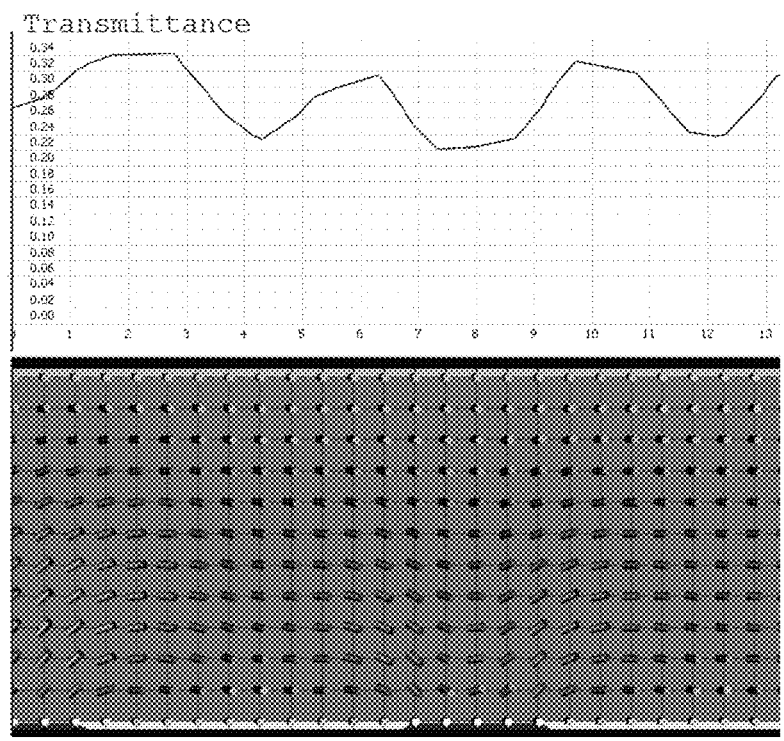
FIG. 11 and FIG. 12 respectively illustrate analytical charts of transmittances of x and y axial sections under the same W/S and drive voltage in some embodiments of the liquid crystal lens assembly of the present disclosure.
Figure 12:
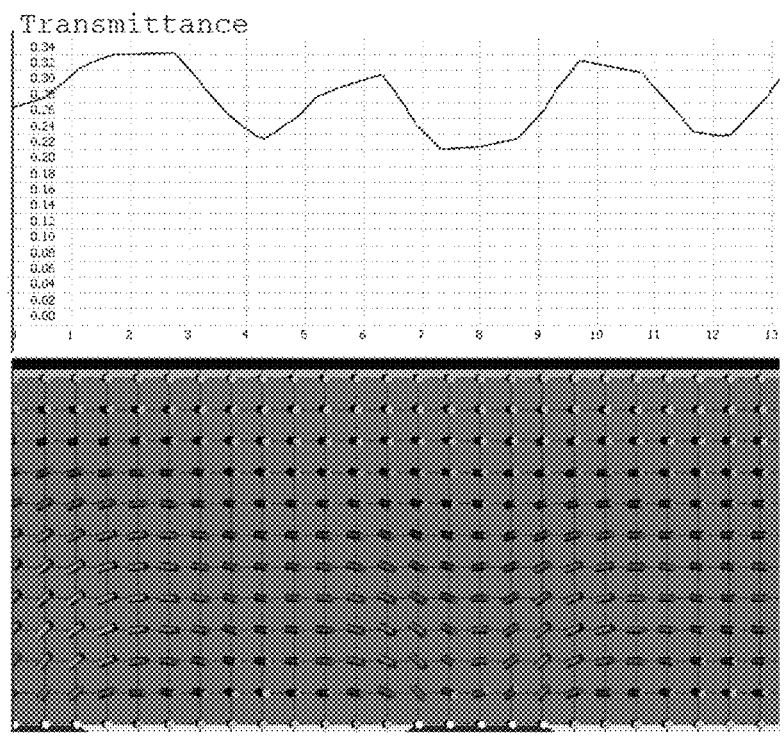

Under the above same conditions, analytical charts for transmittances of the x axis and y axis directional sections in some embodiments of the present disclosure are seen in FIG. 11 and FIG. 12. As seen from FIG. 11 and FIG. 12, the analytical charts for transmittances in the x axis direction and the y axis direction are almost the same, which is caused by consistency of the bar electrodes in width and space. In FIG. 11 and FIG. 12, the transmittance value in either the x axis direction or the y axis direction is in an obvious fluctuation, a phase difference corresponding to the liquid crystal lens can be formed, and a peak can reach 0.32. Also, the liquid crystal molecules are periodically arranged in a circular arc. Thus it can be learned that, the transmittances in both the x axis and y axis directions in these embodiments of the present disclosure are relatively high, and a control function for both the x-axis and y-axis directional components of the light source can be served.

Figure 13:
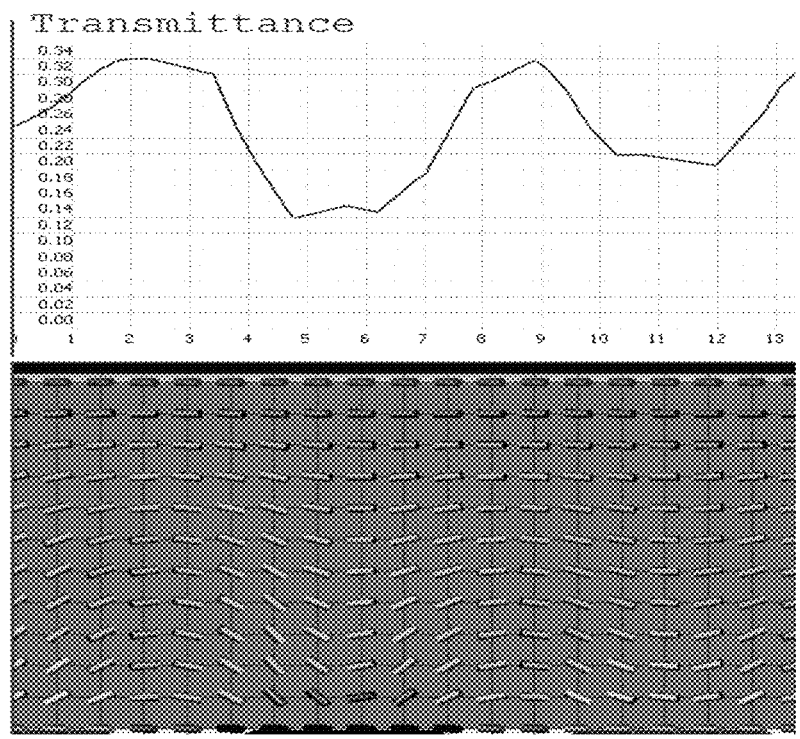
FIG. 13 illustrates an analytical chart of a transmittance of a section at the angle of 45 degree between x and y axes under the same W/S and drive voltage in some embodiments of the liquid crystal lens assembly of the present disclosure.

FIG. 13 illustrates an analytical chart of a transmittance of a section at the angle of 45 degree between x and y axes under the same W/S and drive voltage in some embodiments of the liquid crystal lens assembly of the present disclosure. From FIG. 13, it can be still seen that the liquid crystal molecules present a same arc arrangement as those in the x axis and y axis directions. It also indicates the effect of the aforementioned liquid crystal lenses which are periodically arranged and similar to a semispherical shape as seen in FIG. 7.

As compared with the liquid crystal lens assembly only capable of achieving a single axial control in the aforementioned related technologies, the liquid crystal lens assembly of the present disclosure achieves a utilization efficiency of light beams which is theoretically increased by 20% to 30% over that of the related technologies, in case of a cooperation with a black light shielding layer, in applications of achieving a gray scale display.

The aforementioned respective embodiments of the liquid crystal lens assembly of the present disclosure are applicable to various liquid crystal panels and a liquid crystal display device employing the liquid crystal panel. Accordingly, the present disclosure further provides a liquid crystal panel including any one of the aforementioned embodiments of the liquid crystal lens assembly, as well as a liquid crystal display device including the aforementioned liquid crystal panel, and can obtain a better utilization efficiency of light beams and display quality. The display device may be a mobile phone, a tablet computer, a TV set, a display, a notebook computer, a digital photo frame, a navigator, or any other product or member having a display function.

Figure 14:
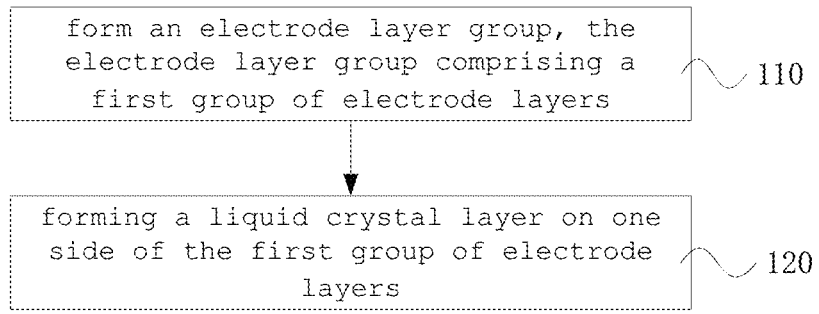
FIG. 14 illustrates a flow chart according to some embodiments of the manufacturing method of the liquid crystal lens assembly of the present disclosure.

FIG. 14 illustrates a flow chart according to some embodiments of the manufacturing method of the liquid crystal lens assembly of the present disclosure. Referring to FIG. 14, the manufacturing method of the liquid crystal lens assembly as provided by the present embodiments comprises a step 110 and a step 120. In the step 110, an electrode layer group is formed. The electrode layer group includes a first group of electrode layers, the first group of electrode layers having a first electrode layer of a plurality of first bar electrodes and a second electrode layer of a plurality of second bar electrodes, an extending direction of the first bar electrodes intersecting with that of the second bar electrodes. In the step 120, a liquid crystal layer is formed on one side of the first group of electrode layers. In this way, a structure of the liquid crystal lens assembly in FIG. 4 and FIG. 5 may be formed.

The extending direction of the first bar electrodes can be configured to intersect with the second bar electrodes at an angle of 80 to 100 degrees when the electrode layer group is formed. This angle is close to an orthogonal angle, and thus the light source components assigned to the mutually orthogonal coordinate directions can achieve a strong controlled function, such that a high utilization efficiency of light beams can be obtained. Furthermore, referring to FIG. 6, the extending direction of the first bar electrodes 2 and that of the second bar electrodes 3 may be set to be perpendicular to each other, such that the utilization efficiency of beams can be increased to a greatest extent.

In addition, to cause a drive voltage formed by the bar electrodes to control beams more uniformly, the plurality of first bar electrodes 2 may be parallel to each other with an identical space when the electrode layer group is formed. Moreover, a width of each of the first bar electrodes 2 may also be identical. Referring to FIG. 6, the space between any two adjacent the first bar electrodes 2 may has a equal space s1, and each of the first bar electrodes 2 may have an equal width w1. By setting the space s1 to be equal and setting the width w1 to be equal, an angle of light beams in the perpendicular direction of the first bar electrodes 2 can be controlled more uniformly. In some other embodiments, the space s1 and width w1 may be also set to be unequal according to actual requirements of the control.

Likewise, the plurality of second bar electrodes 3 may be also set to be parallel to each other with the identical space s2, when the electrode layer group is formed. Moreover, a width w2 of each of the second bar electrodes 3 may also be identical, such that an angle of light beams in the perpendicular direction of the second bar electrodes can be controlled more uniformly.

Figure 15:
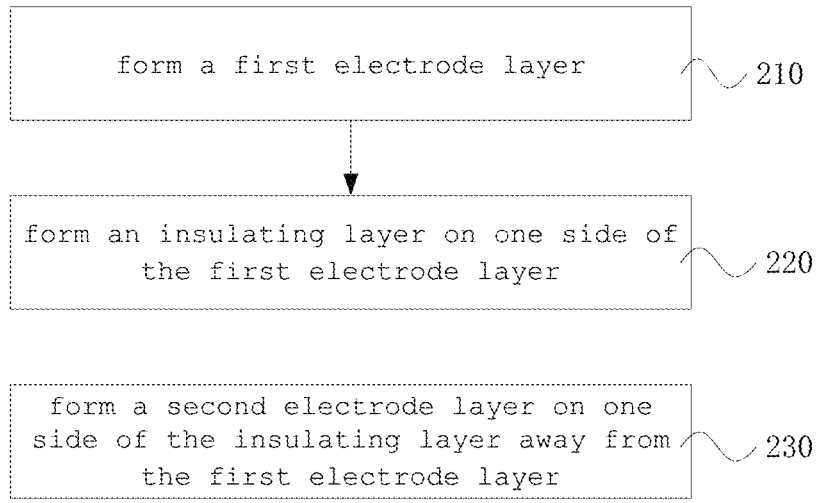
FIG. 15 illustrates a flow chart according to some other embodiments of the manufacturing method of the liquid crystal lens assembly of the present disclosure.

FIG. 15 illustrates a flow chart according to some other embodiments of the manufacturing method of the liquid crystal lens assembly of the present disclosure. Referring to FIG. 15, as compared with the aforementioned embodiments of the manufacturing method, the present embodiments involve that, when the electrode layer group is formed, the operation of forming the first group of electrode layers includes a step 210, a step 220, and a step 230. In the step 210, the first electrode layer is formed. In the step 220, an insulating layer is formed on one side of the first electrode layer. In the step 230, the second electrode layer is formed on one side of the insulating layer away from the first electrode layer. By arranging the insulating layer between the first electrode layer and the second electrode layer, occurrence of a short circuit may be effectively avoided between the first electrode layer and the second electrode layer.

Figure 16:
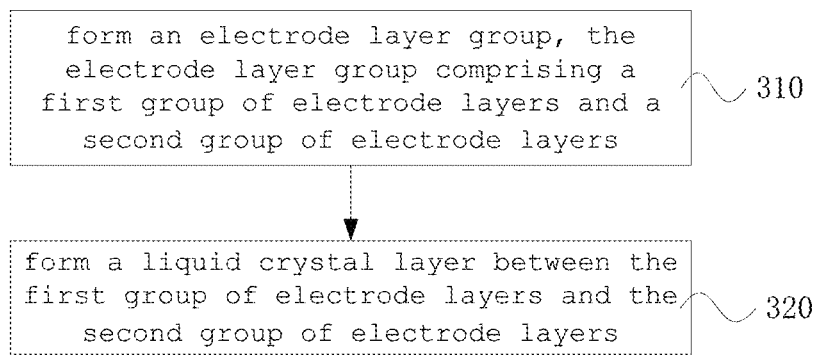
FIG. 16 illustrates a flow chart according to some further embodiments of the manufacturing method of the liquid crystal lens assembly of the present disclosure.

FIG. 16 illustrates a flow chart according to some further embodiments of the manufacturing method of the liquid crystal lens assembly of the present disclosure. Referring to FIG. 16, the manufacturing method of the liquid crystal lens assembly comprises a step 310 and a step 320. In the step 310, an electrode layer group is formed. The electrode layer group includes the aforementioned first group of electrode layers as well as second group of electrode layers. The second group of electrode layer includes a third electrode layer having a plurality of third bar electrodes and a fourth electrode layer having a plurality of fourth bar electrodes, and an extending direction of the third bar electrodes intersects with an extending direction of the fourth bar electrodes. Structures, parameters, and arrangements of the third electrode layer and the fourth electrode layer may refer to the contents about the first electrode layer and the second electrode layer in the aforementioned respective embodiments, and no further details are given here.

In the step 320, a liquid crystal layer is formed between the first group of electrode layers and the second group of electrode layers, such that the liquid crystal layer is located between the first group of electrode layers and the second group of electrode layers. After the first group of electrode layers and the second group of electrode layers are formed in the step 310, they are sealed with an adhesive after being arranged in an overlapping way, and a sealed chamber is formed therebetween. Then liquid crystal is injected into the closed chamber to form a liquid crystal layer.

Up to this point, the embodiments of the present disclosure have been described in detail. In order to avoid obscuring the concepts of the present disclosure, some details known in the art are not described. The person skilled in the art can totally understand how to implement the technical solution disclosed here according to the above description.

Although some specified embodiments of the present disclosure have been explained in detail by the examples, the person skilled in the art shall understand that the above examples are only intended for making explanation rather than for limiting the scope of the present disclosure. The person skilled in the art shall understand that the above embodiments can be amended or equivalent substitution of part of the technical features can be performed without deviating from the scope and spirit of the present disclosure. The scope of the present disclosure is defined by the following claims.

What is claimed is:

1. A liquid crystal lens assembly, comprising:
   a liquid crystal layer;
   a first electrode layer, having a plurality of first bar electrodes; and
   a second electrode layer, having a plurality of second bar electrodes,
   wherein, the first electrode layer and the second electrode layer are both provided on a first side of the liquid crystal layer, an extending direction of the first bar electrodes intersects with an extending direction of the second bar electrodes, and the first bar electrodes and the second bar electrodes are configured to form an electric field in mutually orthogonal directions parallel to the first electrode layer or the second electrode layer so as to realize deflection control of the liquid crystal layer.

2. The liquid crystal lens assembly according to claim 1, further comprising:
   a third electrode layer, having a plurality of third bar electrodes; and
   a fourth electrode layer, having a plurality of fourth bar electrodes,
   wherein, the third electrode layer and the fourth electrode layer are both provided on a second side of the liquid crystal layer, an extending direction of the third bar electrodes intersects with an extending direction of the fourth bar electrodes, and the third bar electrodes and the fourth bar electrodes are configured to form an electric field in mutually orthogonal directions parallel to the third electrode layer or the fourth electrode layer so as to realize deflection control of the liquid crystal layer.

3. The liquid crystal lens assembly according to claim 1, wherein, the extending direction of the first bar electrodes intersects with the extending direction of the second bar electrodes at an angle of 80 to 100 degrees.

4. The liquid crystal lens assembly according to claim 3, wherein, the extending direction of the first bar electrodes is perpendicular to the extending direction of the second bar electrodes.

5. The liquid crystal lens assembly according to claim 2, wherein, the extending directions of the third bar electrodes intersects with the extending direction of the fourth bar electrodes at an angle of 80 to 100 degrees.

6. The liquid crystal lens assembly according to claim 5, wherein, the extending direction of the third bar electrodes is perpendicular to the extending direction of the fourth bar electrodes.

7. The liquid crystal lens assembly according to claim 1, wherein, the plurality of first bar electrodes are parallel to each other with an identical space, and a width of each of the first bar electrodes is identical.

8. The liquid crystal lens assembly according to claim 7, wherein, the plurality of second bar electrodes are parallel to each other with an identical space, and a width of each of the second bar electrodes is identical.

9. The liquid crystal lens assembly according to claim 8, wherein, the space between two adjacent first bar electrodes is the same as the space between two adjacent second bar electrodes, and the width of each of the first bar electrodes is the same as the width of each of the second bar electrodes.

10. The liquid crystal lens assembly according to claim 2, wherein, the plurality of third bar electrodes are parallel to each other with an identical space, and a width of each of the third bar electrodes is identical.

11. The liquid crystal lens assembly according to claim 10, wherein, the plurality of fourth bar electrodes are parallel to each other with an identical space, and a width of each of the fourth bar electrodes is identical.

12. The liquid crystal lens assembly according to claim 11, wherein, the space between two adjacent third bar electrodes is the same as the space between two adjacent fourth bar electrodes, and the width of each of the third bar electrodes is the same as the width of each of the fourth bar electrodes.

13. The liquid crystal lens assembly according to claim 1, wherein, an insulating layer is further provided between the first electrode layer and the second electrode layer.

14. The liquid crystal lens assembly according to claim 2, wherein, an insulating layer is further provided between the third electrode layer and the fourth electrode layer.

15. A liquid crystal panel, comprising: the liquid crystal lens assembly according to claim 1.

16. A liquid crystal display device, comprising: the liquid crystal panel according to claim 15.

17. The liquid crystal lens assembly according to claim 9, wherein a ratio of the width of each of the first bar electrodes to the space between two adjacent first bar electrodes is 2.6/5.4.

18. The liquid crystal lens assembly according to claim 1, wherein, the first bar electrodes and the second bar electrodes are formed by designing cracks on a substrate.

19. A driving method of a liquid crystal lens assembly which comprises a liquid crystal layer, a first electrode layer having a plurality of first bar electrodes and a second electrode layer having a plurality of second bar electrodes, wherein the first electrode layer and the second electrode layer are both provided on a first side of the liquid crystal layer, and an extending direction of the first bar electrodes intersects with an extending direction of the second bar electrodes; the driving method comprises:
   applying a direct current voltage to one group of the first bar electrodes and the second bar electrodes and applying an alternating current voltage with another group of the first bar electrodes and second bar electrodes.

20. The driving method according to claim 19, wherein the direct current voltage is a direct current voltage close to 0V and the alternating current voltage is an alternating current voltage from +5.5V to −5.5V.

* * * * *